United States Patent [19]
Geist

[11] 3,780,764
[45] Dec. 25, 1973

[54] NOZZLE SHUT-OFF AND FLOW CONTROL VALVE

[75] Inventor: Robert Joseph Geist, Isla Verde, P.R.

[73] Assignee: Union Carbide Corporation, New York, N.Y.

[22] Filed: Apr. 7, 1972

[21] Appl. No.: 242,177

[52] U.S. Cl. ............................. 137/613, 425/245
[51] Int. Cl. ........................................... B29f 1/00
[58] Field of Search .................. 137/613, 170.1; 425/245; 264/51; 251/339, 122

[56] References Cited
UNITED STATES PATENTS
3,095,609  7/1963  Lievre .............................. 425/245
2,865,050  12/1958  Strauss .......................... 425/245 X FOREIGN PATENTS OR APPLICATIONS
1,274,579  9/1961  France ............................ 425/245

Primary Examiner—Samuel Scott
Assistant Examiner—Ira S. Lazarus
Attorney—Paul A. Rose et al.

[57] ABSTRACT

A combined nozzle shut-off and flow control valve for use with a plastic molding machine is disclosed comprising a valve body having a bore communicating with outlet passage means of reduced diameter and axially aligned with said bore and radial inlet passage means; a valve stem, having an inner axial passage, axially positioned within said bore and capable of relative axial movement therein; nozzle valve rod means slidably positioned in said valve stem inner axial passage and aligned to register in to effect closure of said outlet passage means; the lower surfaces of said bore and said valve stem having parallel annular surfaces providing a gap of variable width to effect flow control through said valve.

3 Claims, 3 Drawing Figures

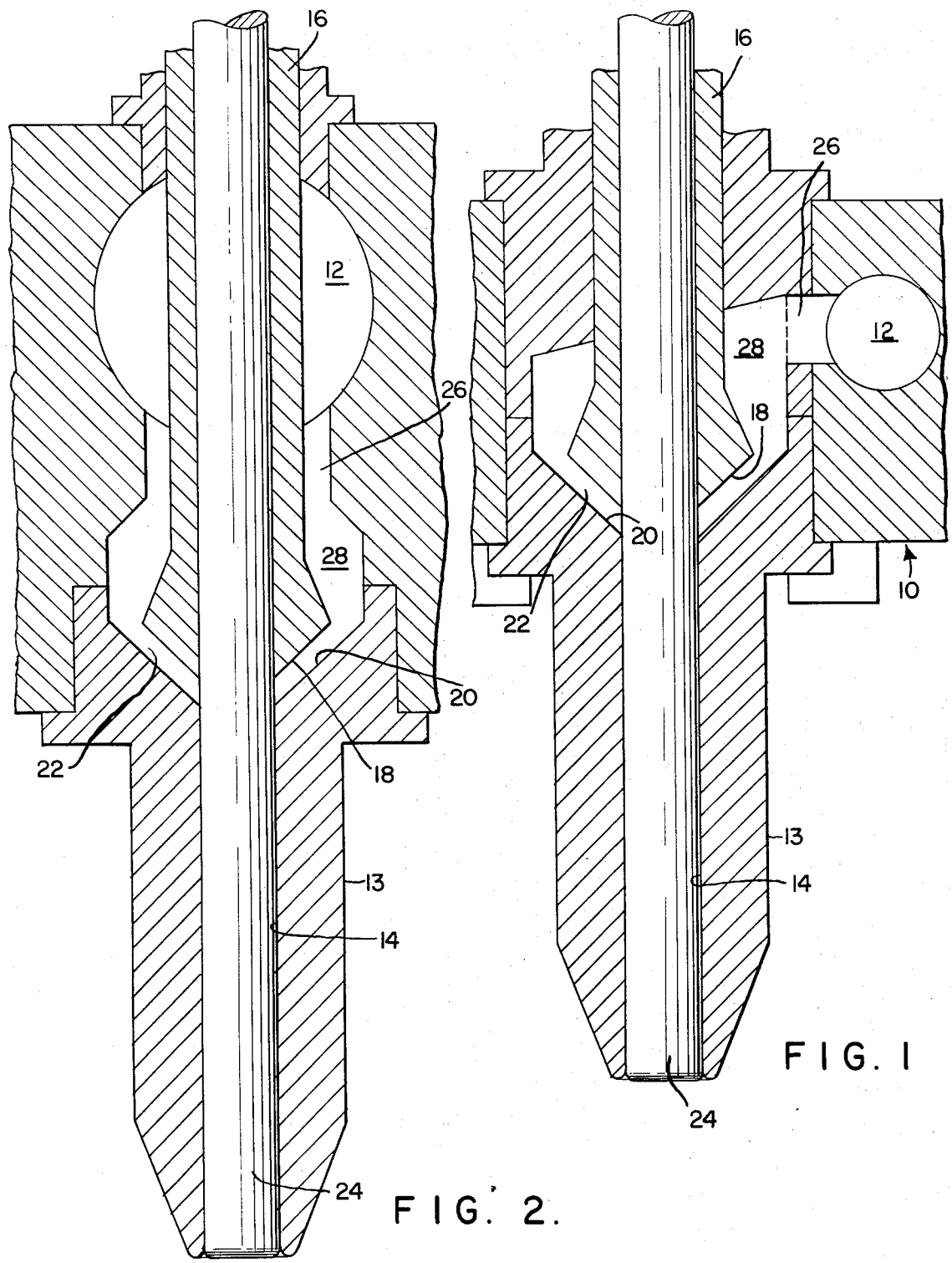

NOZZLE SHUT-OFF AND FLOW CONTROL VALVE

The present invention relates to nozzle shut-off and flow control valves employed in machines for the injection and blow molding of thermoplastic materials. Current injection and blow molding machine nozzle shut-off and flow control valves are separate units. The need exists for a more compact arrangement combining the separate nozzle shut-off and flow control valve into a more compact and streamlined single unit.

In accordance with the present invention, a combined nozzle shut-off and flow control valve for use with a plastic molding machine is provided comprising: a valve body having a bore communicating with outlet passage means of reduced diameter and axially aligned with said bore and radial inlet passage means; a valve stem, having an inner axial passage, axially positioned within said bore and capable of relative axial movement therein; nozzle valve rod means slidably positioned in said valve stem inner axial passage and aligned to register in to effect closure of said outlet passage means; the lower surfaces of said bore and said valve stem having parallel annular surfaces providing a gap of variable width to effect flow control through said valve.

In the valve of the present invention the fluid flows between two parallel or near parallel surfaces each of which exert a frictional drag on the fluid. The extent to which the drag restricts the fluid flow depends upon the length of the surface and clearance between the surfaces. This action is in addition to the restriction of the size of the opening through which the fluid must flow. When a fluid flows over a surface, the fluid in contact with the surface may be assumed to be stationary. There have been reported cases of slip at the surface, but these have been the exception to the rule. A stationary fluid at the surface is assumed for both parallel surfaces of the valve. Although the velocity of the fluid at the surface is zero, it increases as the distance from the surface is increased. In the case of the valve of the invention, the maximum is in the center between the two parallel surfaces. As the surfaces are brought closer together, the average velocity is reduced.

The volume of fluid that can pass between the two surfaces is a function of the area perpendicular to the flow through which the fluid flows and the average velocity of the fluid. As the two surfaces are brought closer together, the area through which the fluid must flow decreases and the average velocity also decreases. Therefore, during the same amount of time less fluid will pass between the surfaces.

In a structural foam injection molding this is important when more than one nozzle and valve are used simultaneously. The nozzle valve-combinations are connected together on a parallel arrangement so that they may be fed off a common feed line. With this arrangement, time is not important but the fact that one nozzle-valve combination has a greater restriction to flow than another will cause more foamed plastic to exit the nozzle with the lesser restriction. This permits, for example, molding a 2 pound part from one nozzle while simultaneously molding a 10 pound part from another nozzle. Prior efforts at making a compact unit, such as typified by the unit of U.S. Pat. No. 3,561,062, only restrict the size of the opening through which the fluid must pass from the manifold into the nozzle.

In the drawings:

FIG. 1 is a sectional view of a valve embodying the present invention;

FIG. 2 is a sectional view of another embodiment of valve embodying the invention.

Figure 3:
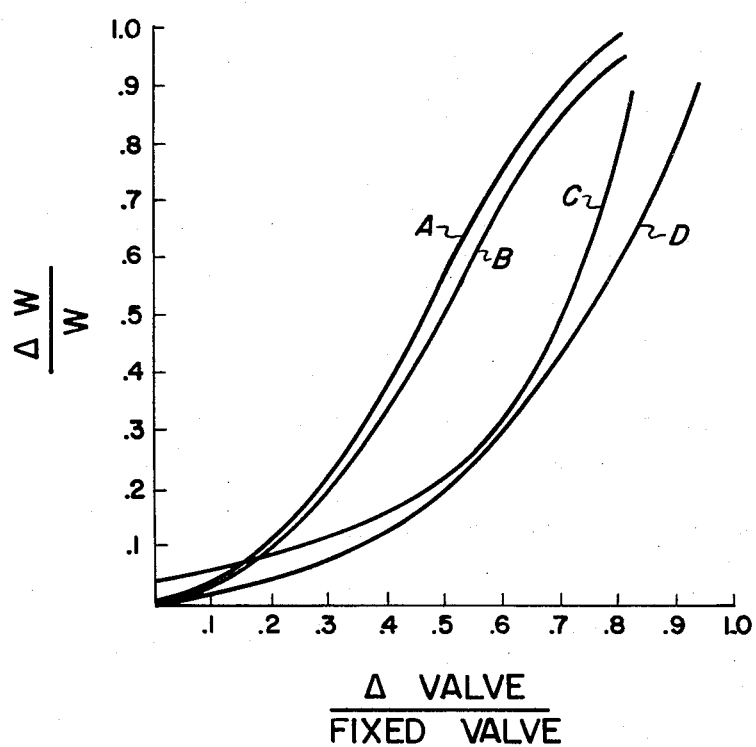
FIG. 3 is a series of curves showing the flow control comparative performance of a valve of the present invention and one of the prior art.

In the embodiment of valve as shown in FIG. 1, manifold 10 contains common feed passage 12. The usual nozzle 13 is shown having circular nozzle passage 14. The valve consists of an axially aligned valve stem 16 positioned in a closed bore in the valve body and having annular land surface 18. A parallel annular surface 20 is also machined into the valve body. By adjusting the valve stem 16 up or down, as by rotation on threads or the like, the gap width can be variably adjusted. The two parallel surfaces, 18 and 20, are the surfaces mentioned above in the discussion of the valve principle. Nozzle rod 24 passes through the valve stem and is concentric with it. Actuated by external means, nozzle rod 24 slides in valve stem 16 and is shown in the shut-off position which does not permit material to flow through the nozzle passage 14. By retracting the rod from nozzle passage 14, the flow of material commences and the nozzle is thus open.

In operation, when nozzle rod 24 is retracted from nozzle passage 14, the material flows from manifold passage 12 through inlet passage 26 and into annular chamber 28 in the valve body. The material passes around valve stem 16 and through the gap 22 where the throttling or flow control takes place. It then passes through nozzle passage 14, through nozzle and into the mold. When the desired volume of material has been injected into the mold, the nozzle rod is passed into passage 14 closing the nozzle. Once the valve stem is adjusted to the proper flow control, it remains in that position and is not changed for each molding cycle. This is in contrast to the nozzle rod which moves in and out of the nozzle passage for each molding cycle. By adjusting the valve stem, the size of the gap 22 between the parallel surfaces, 18 and 20, may be changed and the flow through valve may be altered.

The angle of the land of the valve stem and parallel surface of the valve body is not believed to be critical. A large angle requires less movement of the valve stem for a given amount of gap change than does a smaller angle. For the same land length, a shallow angle results in a less bulky valve stem and less bulky valve assembly. The amount that the bulk is reduced is small. Again, for the same land length, a shallow angle reduces the ratio of the inlet area to the outlet area of the valves.

In the embodiment shown in FIG. 2 of the drawing, nozzle rod 24 and valve stem 16 pass through the manifold common feed passage 12. This embodiment is believed to offer better streamlining. In other respects, its structure and operation is the same as that of the embodiment of FIG. 1.

Although the structural foam injection molding process does not require multiple nozzles, the typical structural foam machine, as described in U.S. Pat. Nos. 3,268,636 and 3,436,446, uses them to inject foamed plastic into molds. These nozzles are grouped together into at least one manifold. This manifold contains a passage that feeds the plastic to the nozzles and the nozzles branch from that passage. Current practice places throttle valves between the manifold passage and each nozzle. When more than one nozzle is needed, the throttle valves are used to regulate the quantity of material that flows out of each nozzle being used. Thus, if a part or parts with a total weight of ten pounds are being molded, the valves can be adjusted so that two pounds exists through one nozzle, three pounds through another and five pounds through a third nozzle. There is no limit to the number of nozzles that may be used. The manifold is fed by an accumulator which is, in turn, fed foamed plastic by an extruder. The accumulator displaces an adjustable controlled volume of material. Unless the valves are all fully closed, the accumulator will force the same amount of foamed plastic out of the machine regardless of the settings on the throttle valves. Adjusting the throttle valve alters the distribution of the foamed plastic but not the total amount molded.

As shown in the curves of FIG. 3 of the drawings, the relationship between the percentage change in flow $\Delta W/W$ is shown for the corresponding percentage change in adjustment $\Delta V/V$. Curves A and C show the relationship for a valve embodying the invention while curves B and D show the relationship for a separate nozzle and throttling valve of the prior art. These comparative tests match performance curves for these two types of valves in order to compare the full open gap necessary to achieve similar results. The tests were made employing high density polyethylene as the plastic melt material and resulted in the following data:

| Curve | Gap |
| --- | --- |
| A | 0.278 in. |
| B | 0.166 in. |
| C | 0.500 in. |
| D | 0.333 in. |

This data shows that the larger gaps of the valve of the present invention permit less sensitive adjustment than those of the equivalent flow smaller gaps of prior art valves. Therefore, the valve of the invention affords more throttling control.

In one example of the operation of the combined nozzle shut-off and flow control valve of the invention, a valve as shown in FIG. 1 of the drawing was used to control the flow of plastic melt material in a structural foam injection molding machine. The melt material was high impact polystyrene containing foaming agent and maintained at a pressure of 2,700 p.s.i. and temperature of 480°F. A total melt shot weight of one pound was distributed through the valve to two injection nozzles depending on the adjustment of the annular gaps of the two nozzle valves obtained by rotary screw adjustment of the valve stems.

The land length of the throttling surface on both valve stems was 1 inch. The land area made a 45° angle with the axis of the valve stem and tapered from a maximum diameter of 2 inches to a minimum diameter of 0.6255 inches which was the size of the passage in the valve stem through which the nozzle rod passes. The over-all size of the valve body chamber was 2.5 inches in diameter and 1 9/16 inches in depth from the upper valve body to where the 45° tapered surface began. The nozzle rod was 0.6245 inches in diameter and the passage was 0.6255 inches in diameter. The passage in the manifold as 1.5 inches in diameter and the passage connecting the manifold to the valve chambers was three-fourths inch in diameter. The manifold and valve stem were constructed by steel, while the upper valve body and nozzle rod were constructed of bronze alloy.

In other operations, the valve was used to control the flow of polyethylene and other plastic melt materials.

What is claimed is:

1. A combined nozzle shut-off and flow control valve for use with a plastic molding machine comprising: a valve body having a bore including a lower surface communicating with outlet passage means of reduced diameter and axially aligned with said bore and radial inlet passage means; a valve stem, having an inner axial passage and having an outer lower surface, axially positioned within said bore and capable of relative axial movement therein; nozzle valve rod means slidably positioned in said valve stem inner axial passage and aligned to register in to effect closure of said outlet passage means; said lower surfaces of said bore and said valve stem being parallel annular surfaces providing a gap of variable width to effect flow control through said valve.

2. The nozzle valve in accordance with claim 1, wherein an annular chamber is provided between said valve body bore and said valve stem which is in communication with said radial inlet passage means and said gap of variable width.

3. The nozzle valve in accordance with claim 2, wherein said radial inlet passage terminates in an annular manifold chamber positioned between said valve body bore and said valve stem upstream of said annular chamber.

* * * * *